United States Patent [19]

Grane et al.

[11] 3,927,121

[45] Dec. 16, 1975

[54] PHENYL METHYL CARBINOL MANUFACTURE BY HYDROGENATION OF ACETOPHENONE

[75] Inventors: Henry R. Grane; Thomas S. Zak, both of Springfield, Pa.

[73] Assignee: Atlantic Richfield Company, Los Angeles, Calif.

[22] Filed: Aug. 5, 1974

[21] Appl. No.: 494,573

[52] U.S. Cl................................ 260/618 H; 252/475
[51] Int. Cl.² ........................................ C07C 29/00
[58] Field of Search .............................. 260/618 H

[56] References Cited
UNITED STATES PATENTS

| | | | |
|---|---|---|---|
| 2,156,217 | 4/1939 | Andrews et al. ............... | 260/618 E |
| 2,334,100 | 11/1943 | Ipatieff et al. .................... | 260/618 E |
| 2,575,403 | 11/1951 | Yound et al. ..................... | 260/618 E |
| 2,614,107 | 10/1952 | Wender et al. ................... | 260/618 E |

*Primary Examiner*—James O. Thomas, Jr.
*Assistant Examiner*—James H. Reamer
*Attorney, Agent, or Firm*—John R. Ewbank

[57] ABSTRACT

A stream of acetophenone and hydrogen flows through a fixed catalyst bed containing pellets of copper oxide-zinc oxide catalyst (at least some of the copper oxide being reduced to copper) to produce a product stream containing phenyl methyl carbinol. The hydrogenation is conducted at 118°C., 80 atmospheres pressure with a 3:1 hydrogen to acetophenone ratio at a WHSV of about 1.

2 Claims, No Drawings

PHENYL METHYL CARBINOL MANUFACTURE BY HYDROGENATION OF ACETOPHENONE

FIELD OF INVENTION

This invention relates to aromatic alcohols prepared by catalytic hydrogenation of aromatic ketones and is particularly concerned with the catalytic hydrogenation of acetophenone to phenyl methyl carbinol.

PRIOR ART

One of the routes for preparing styrene from ethyl benzene involves the oxidation of ethyl benzene to acetophenone followed by hydrogenation of the ketone to the alcohol, followed by catalytic dehydration of the phenyl methyl carbinol to styrene. Once the styrene is fromed from the phenyl methyl carbinol, it is more readily separated in high purity from the product stream than is the separation of high purity styrene from the crude product streams from some methods in which ethyl benzene is directly dehydrogenated to styrene. The market for phenyl methyl carbinol is sufficiently small that it is generally more manageable to convert phenyl methyl carbinol to styrene for simple marketing than to arrange for the selling of phenyl methyl carbinol. Similarly, the market for acetophenone is sufficiently specialized that at plants producing acetophenone as a by-product, it is generally more profitable to hydrogenate and dehydrate to form readily marketable styrene than to attempt to market by-product acetophenone.

Over a period of decades in various parts of the world, acetophenone has been hydrogenated to phenyl methyl carbinol on a scale of tons per month. In the laboratory, the hydrogenation of acetophenone has been a preferred reaction for evaluating catalysts. Ring hydrogenation to form cyclohexane derivatives and hydrogenolysis to form ethyl benzene are competing with the reactions for hydrogenation to phenyl methyl carbinol. Certain dimerization reactions also compete with phenyl methyl carbinol formation. Evaluations of selectivity of various catalysts for the several competing reactions at a standard set of experimental conditions are derived from the data concerning such hydrogenation of acetophenone.

As explained in Young U.S. Pat. No. 2,575,403, a copper chromite catalyst in which there are from about 7 to about 25 parts by weight of chromium per 100 parts by weight of copper is a selective catalyst for the hydrogenation of acetophenone to phenyl methyl carbinol at 50–200 psig and 120°–200°C. preferably 100–150 psig, 130°–175°C. and 9–15 parts of chromium per 100 parts of copper, and desirably about 75 psig, 130°C. and 13.8 parts of chromium per 100 parts of copper. It has generally been the practice to use copper chromite as a slurry, and thereafter to remove the catalyst from the product stream by filtration. Raney nickel and other types of slurried hydrogenation catalysts have also been employed in hydrogenating streams comprising acetophenone for the preparation of product streams comprising phenyl methyl carbinol. Notwithstanding the extensive amount of experimental hydrogenation of acetophenone and notwithstanding the commercial tonnage production of phenyl methyl carbinol by hydrogenation of acetophenone, there has been no answer to the long-standing demand for a fixed bed hydrogenation process for preparing phenyl methyl carbinol by hydrogenation of acetophenone at high selectivity at conditions having commercial attractiveness.

SUMMARY OF THE INVENTION

In accordance with the present invention, a fixed bed of particles of copper oxide-zinc oxide catalyst is employed in hydrogenating acetophenone to phenyl methyl carbinol. The catalyst is remarkable by reason of its high selectivity for carbinol formation without ring hydrogenation, or hydrogenolysis to ethyl benzene, or dimerization, or other side reactions. Moreover, a high conversion is achieved at conditions sufficiently mild and manageable to permit commercial operation of the process. A relatively low space rate may be utilized because of the extremely high selectivity of the catalyst, which is relatively inexpensive. Hydrogen may be processed on a once-through basis, but ordinarily is recycled to a predominant extent, with only a minor slip stream being withdrawn for removal of impurities from the circulating hydrogen stream. Hydrogen is injected at a rate substantially equal to the sum of the stoichiometric consumption of hydrogen in the reactor and the impurity stream withdrawal rate. The copper oxide-zinc oxide catalyst is resistant to poisoning by the impurities encountered in typical product streams, whereby the catalyst has acceptable stability. Important advantages accrue from the shiftover from the slurry catalyst systems heretofore conventional in commercial hydrogenation of acetophenone to a fixed bed system previously unattainable for commercial tonnage production of phenyl methyl carbinol (PMC). The success of the copper oxide-zinc oxide catalyst of the present invention must be evaulated in the light of the failure of the fixed beds previously proposed for PMC.

DESCRIPTION OF EMBODIMENTS

The nature of the present invention is further clarified by reference to a plurality of examples.

EXAMPLE I

A laboratory apparatus for the flow of a mixture of liquid and gas through a fixed bed of catalyst was employed in a plurality of hydrogenation runs. The liquid stream flowed downwardly through the catalyst bed at a velocity corresponding to 2 weight of liquid reactant stream per weight of catalyst bed per hour, maintaining a hydrogen to acetophenone mol ratio of approximately 5:1 at the reactor inlet, the hydrogen pressure at the reactor inlet being about 1200 psig. In a control procedure, the catalyst pellets consisted of copper chromite containing a barium oxide stabilizer, such catalyst being a commercially available (Harshaw, Cu-0402T ⅛ inch) catalyst.

The percentage of aceotophenone which reacted was designated as the percentage conversion. The percentage selectivity was the ratio of the moles of phenyl methyl carbinol produced per mol of acetophenone reacted. Using said copper chromite control catalyst, the significant results are summarized as follows:

| Temperature °F. | °C. | Conversion Per Cent | Selectivity Per Cent |
| --- | --- | --- | --- |
| 240 | 116 | 14 | 90 |
| 290 | 143 | 29 | 73 |
| 340 | 171 | 37 | 62 |

It will be noted that the copper chromite permitted greater conversion as the temperature was increased but that the temperature of 171°C. was providing 37 percent conversion, which is undesirably low for a reaction of this type. Moreover, the selectivity for the reaction decreased as the temperature was increased. The copper chromite pellets appeared to be unsuited for the desired hydrogenation of acetophenone to phenyl methyl carbinol at the conditions investigated.

A catalyst bed is prepared from cylindrical tablets having a diameter of about ¼ inch and a thickness of about ⅛ inch and consisting essentially of a mixture of oxides of zinc and copper and containing less than 2 percent aluminum. The zinc to copper atom ratio in the mixed oxide catalyst tablets is about 2:1. The surface area of the tablets is about 40 square meters per gram. The tablets have a bulk density of about 80 pounds per cubic foot, thus being greater than a significant portion of catalyst beds which are typically in the range from about 25 to about 70 pounds per cubic foot. Each tablet has a sidewise crushing strength of at least 15 pounds and may exceed 70 psig. The catalyst tablets for this example are available commercially from Catalyst and Chemicals, Inc. as C61-1 catalyst tablets.

Catalyst tablets comprising copper oxide and zinc oxide (thus being of a type exemplified by said C61-1) have been used significantly in the water-gas shift reaction for the conversion of a mixture comprising of carbon monoxide and steam into a mixture of hydrogen and carbon dioxide at a pressure such as 150 pounds per square inch at a temperature of a magnitude such as 260°–320°C. Any catalyst which has been designed for and used for vapor phase reactions is likely to be rejected when selecting a catalyst for a liquid phase reaction.

When a copper oxide-zinc oxide type of catalyst is treated in a stream comprising hydrogen at a temperature which is increased to about 200°C., at least a portion of the copper oxide is reduced to copper, providing catalytic sites of metallic copper in the zinc oxide matrix. The copper sites are sufficiently well positioned that the metallic copper on zinc oxide type of reduced form of C61-1 catalyst shows little propensity for copper migration or copper agglomeration during prolonged periods of use at the hydrogenation conditions required for commercial hydrogenation of acetophenone. The propensities toward copper agglomeration are decreased when the ratio of zinc to copper atoms is greater than about 2.

Acetophenone was hydrogenated in the bed of reduced copper oxide-zinc oxide catalyst maintaining a pressure at the reactor inlet of 1200 psig, a 5:1 molar hydrogen ratio at the reactor inlet, a space velocity of 2 weights acetophenone per weight of catalyst per hour, the liquid flowing downwardly through the catalyst bed, thus duplicating a significant portion of the conditions employed in the control test with the bed of particles of copper chromite catalyst. The results of the hydrogenation of acetophenone over said copper oxide-zinc oxide catalyst bed are as follows:

| Temperature °F. | °C. | Conversion Per Cent | Selectivity Per Cent |
|---|---|---|---|
| 260 | 127 | 37 | 94 |
| 280 | 138 | 61 | 87 |

The attainment of 87 percent selectivity at a conversion as high as 61 percent was deemed to be indicative that the mixture of zinc oxide and copper oxide had important advantages as a fixed bed catalyst for the hydrogenation of acetophenone.

EXAMPLE II

The testing apparatus was modified so that a fixed bed of catalyst was subjected to liquid upflow, thus differing from the downflow of Example I. The hydrogen to acetophenone molar ratio at the reactor inlet was 5:1. The pressure at the reactor inlet was 1200 psig or about 81 atmospheres. The stream of a technical grade of acetophenone was directed through the catalyst bed at a controlled space velocity. The catalyst bed consisted of the particles of zinc oxide-copper oxide tablets described in Example I. The bed was subjected to the standard hydrogenative reduction step and cooled to operating temperature prior to the introduction of feed. Data relating to four runs are as follows:

| Temperature °F. | °C. | WHSV | Conversion Per Cent | Selectivity Per Cent |
|---|---|---|---|---|
| 180 | 82 | 2 | 28 | 100 |
| 235 | 113 | 2 | 38 | 97 |
| 275 | 135 | 2 | 79 | 87 |
| 240 | 116 | 1 | 89 | 93 |

The data indicate that copper oxide-zinc oxide catalyst is highly selective in the hydrogenation of acetophenone to phenyl methyl carbinol.

EXAMPLE III

Using the upflow apparatus and catalyst of Example II, acetophenone was hydrogenated using a 3/1 H₂/feed ratio (instead of 5/1) at an inlet pressure of about 81 atmospheres (1200 psig) to obtain the following results:

| Temperature °F. | °C. | WHSV | Conversion Per Cent | Selectivity Per Cent |
|---|---|---|---|---|
| 240 | 116 | 1 | 85 | 95 |
| 245 | 118 | 1 | 90 | 92 |
| 275 | 135 | 1 | 94 | 88 |
| 275 | 135 | 2 | 78 | 88 |

The 83 percent yield of phenyl methyl carbinol by either the combination of 94 percent conversion at 88 percent selectivity or the combination of 90 percent conversion at 92 percent selectivity was deemed indicative that the catalyst was advantageous in the selective hydrogenation of acetophenone.

EXAMPLE IV

By a series of tests, it is established that appropriate limits exist for the process. The conversion is objectionably low if the reaction temperature is below 90°C. Ethyl benzene, cyclohexyl derivatives, dimers and/or other by-products are formed in troublesome amounts if the reaction temperature is above 150°C. Even at 148°C. and elevated pressure and high hydrogen to acetophenone ratio, the space velocity should not exceed 10 weights of acetophenone per weight of catalyst per hour inasmuch as the catalyst is not a highly active hydrogenation catalyst and inasmuch as the catalyst is not characterized by outstanding diffusion of aromatic compounds through the pores of the catalyst tablet. The processing cost for the hydrogenation, comprising mixing the recycled hydrogen stream and fresh hydrogen with the feed, pumping of the feedstock toward the reactor, maintaining the temperature of the reactor, processing the effluent stream for the separation of unreacted gas (recycled hydrogen) and preparation of the hydrogenated product stream for subsequent steps are sufficiently costly that the space rate generally employed in the process is not a dominant component in the total overall cost of the hydrogenation step. Decreasing the space rate involves the use of a larger catalyst inventory, which is not costly because the catalyst is inexpensive. As the reactor must withstand a pressure selected within the 6 to 150 atmospheres range, the marginal cost of a larger reactor represents a significant part of the marginal cost of a lower space rate. The larger reactor for holding the increased catalyst inventory also accounts for greater radiation heat loss at lower space rates. Space rates of from about 0.2 to 10 WHSV limit the range of weight of acetophenone per weight of catalyst per hour. Space velocities from about 0.5 to 2 are a preferred range. A space rate of about 0.7 exemplifies a desirable feature.

The pressure of the reactor must be maintained within the range from about 6 to about 150 atmospheres; that is, from about 90 to about 2200 psig. The pressure is desirably about from 50 to about 120 atmospheres.

The hydrogen ratio, that is, the moles of hydrogen per mole of product to be hydrogenated must be within a range from about 1 to about 30. If the ratio were less than 1:1, then there would be insufficient hydrogen to permit high conversion. When a ratio greater than 30:1 is used, the conversion decreases unsatisfactorily. The hydrogen ratio is desirably from about 2:1 to about 5:1.

The reactor should be loaded with catalyst particles consisting of a mixture of oxides comprising copper oxide and zinc oxide. The temperatures of spray drying of a precursor composition can be regulated to bring about formation of such oxides by thermal decomposition of salts such as oxalates, carbonates, etc. as is customary in catalyst production.

The hydrogenative pre-treatment of the catalyst oftentimes brings about the reduction of at least a portion of the copper oxide, whereby metallic copper sites are distributed throughout the matrix of zinc oxide. A mixture of nitrogen and hydrogen can be directed through the catalyst bed as it is gradually heated to about 200°C. for such hydrogenative pre-treatment.

The atomic ratio of zinc atoms to copper atoms in the catalyst must be within the range from 2 to 8 zinc atoms per copper atom. Thus, the catalyst can be described as a zinc oxide matrix containing from about 1/9 to about ⁻ mole ratio of copper oxide. Zinc oxide and copper oxide have densities which are about 342 and 404 pounds per cubic foot respectively. The density of the catalyst tablets is low enough that the bulk density of the bed of pellets is about 80 pounds per cubic foot, thus exceeding the bulk density of most catalyst beds by more than 10 percent. The catalyst tablet is designed primarily for vapor phase reactions, and it is surprising that the catalyst has the type of porosity permitting liquid aromatic components to diffuse into the interior portions of the tablet.

The prior art descriptions concerning copper oxide-zinc oxide catalysts provide a variety of tableted catalysts suitable for use in the novel method of using such catalyst in the present invention. A suitable catalyst can be prepared by mixing an aqueous solution of copper acetate, and zinc acetate and treating the mixed solution with carbon dioxide under several atmospheres pressure to form a suspension of an aqueous sol of mixed carbonates of zinc and copper. The solution concentrations are so controlled that the zinc to copper atom ratio is about 3:1 in the sol. The sol is water washed to minimize entrainment of acetate ions. The washed sol is spray dried to provide a powder consisting of the mixed oxides of zinc and copper in a 3:1 atom ratio. Such powder is subjected to compression in a tableting machine to prepare the desired tablets. The tablets are heat activated and hydrogenatively reduced in a steam comprising hydrogen which is gradually heated to about 200°C.

Variations in the composition of the catalyst are made by controlling the aqueous composition subjected to the spray-drying step. It is shown that the zinc to copper atom ratio must be maintained within a range from about 2:1 to about 8:1 in order to achieve the desired results of the present invention. If the zinc to copper atom ratio is excessively high, so that the copper content of the catalyst is below about 9 percent, then cost problems are encountered, even at the lower end of the space rate range, in attaining a commercially attractive extent of conversion at a price having competitive advantages. If the copper content is excessively high, such as above about 33 percent, then the selectivity of the catalyst for formation of phenyl methyl carbinol is impaired. The stability of the catalyst and ability to withstand prolonged operation without sintering or loss of surface area are also lost if the zinc oxide matrix is less than about 67 percent of the catalyst.

Various modifications of the invention are possible without departing from the scope of the appended claims.

It is claimed:

1. In the method in which acetophenone is hydrogenated by reaction with hydrogen in the presence of a catalyst to form phenyl methyl carbinol, the improvement which consists of utilizing as the catalyst for the catalytic hydrogenation granular catalyst particles consisting essentially of copper metal in a zinc oxide matrix, the ratio of zinc atoms to copper atoms being 2:1, said hydrogenation being conducted by directing a stream of liquid acetophenone and hydrogen through a fixed bed of said granular catalyst particle at a temperature within the range from 113° to 138°C. at a pressure of 1200 psig at a hydrogen to acetophenone mol ratio of from 1:1 to 30:1 and a weight hourly space velocity within a range from 1 to 2 weight of acetophenone per weight of catalyst per hour.

2. The method of claim 1 in which the hydrogen to acetophenone ratio is within the range from 2:1 to 5:1.

* * * * *